Dec. 24, 1963    J. A. FRAYLICK ETAL    3,115,225
MOLDING STRIP INSTALLATION
Filed June 29, 1960    2 Sheets-Sheet 1

INVENTORS.
James A. Fraylick,
BY George Machek, &
Benjamin S. Stawinski

E.W. Christen
ATTORNEY

Dec. 24, 1963 J. A. FRAYLICK ETAL 3,115,225
MOLDING STRIP INSTALLATION
Filed June 29, 1960 2 Sheets-Sheet 2

INVENTORS.
James A. Fraylick,
BY George Machek, &
Benjamin S. Stawinski
E. W. Christen
ATTORNEY United States Patent Office 3,115,225
Patented Dec. 24, 1963

3,115,225
MOLDING STRIP INSTALLATION
James A. Fraylick, Warren, George Machek, Birmingham, and Benjamin S. Stawinski, Southfield, Mich., assignors to General Motors Corporation, Detroit, Mich., a corporation of Delaware
Filed June 29, 1960, Ser. No. 39,650
2 Claims. (Cl. 189—88)

This invention relates to molding installations and, more particularly, to an improved means for securing such molding strips on supporting panels.

In motor vehicle design and manufacture, it is quite common to use molding strips of substantially C-shaped cross section at various positions for aesthetic appeal and to cover up objectionable seams and joints. A problem usually exists, when making such installations, in finding a suitable fastening device for securing the strip to the supporting panel. It is desirable to have a fastening device which is applicable to molding strips with varying cross-sectional configurations and sizes and, further, to provide a positive retention to prevent the molding strips from loosening or falling from the supporting panel during the life of the vehicle. A further problem is often found in the sealing of the fastening device in the supporting panel. Water generally collects around the molding strips and, if the aperture in the supporting panel is not properly sealed, rust and corrosion are permitted to form, thus destroying the fastening and causing damage to the painted surface of the panel.

The device in which this invention is embodied comprises, generally, a molding strip fastening installation utilizing a plate or head member received between the inturned flanges of the molding strip and a stud element secured in the plate member and received in a suitable aperture in the supporting panel. Resilient means are provided on the stud element to securely lock the stud, the plate member and the molding strip against the supporting panel.

The fastening device is adaptable to a wide variety of shapes and sizes of molding strips and is relatively simple to manufacture and assemble. The locking of the molding strip to the supporting panel is positive, thus greatly decreasing the possibility of the molding strip becoming loose at some later time. The socket member is so constructed as to permit a small amount of axial alignment when the fastening device is not precisely placed in the molding strip prior to insertion in the supporting panel. Further, the socket member is so constructed as to seal the aperture in the supporting panel to prevent the entry of water and prevent the formation of rust and corrosion.

These and other advantages will become more apparent from the following description and drawings.

Figure 1:
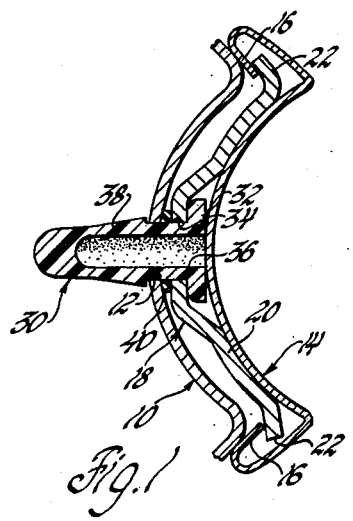
FIGURE 1 is a cross-sectional view of a molding strip installation in which this invention is embodied, illustrating the position of the various parts.
Figure 2:
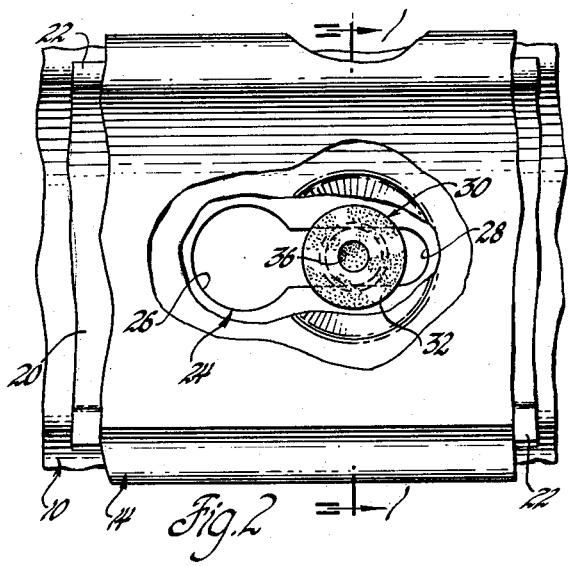
FIGURE 2 is a front view of the molding strip installation illustrated in FIGURE 1, with parts broken away to show the retention means in the plate member.
Figure 3:
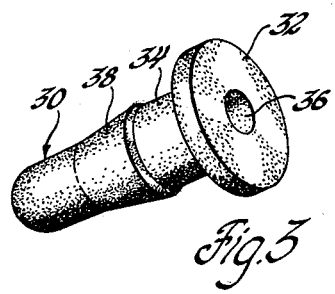
FIGURE 3 is a perspective view of the stud element utilized in the molding strip installation illustrated in FIGURES 1 and 2.

Referring more particularly to the drawings, FIGURES 1 through 3 illustrate a molding strip installation. A supporting panel, illustrated generally by the numeral 10, is provided with a suitable aperture 12, the shape of which may be circular, rectangular or any other suitable configuration. A molding strip, illustrated generally by the numeral 14, is secured to the supporting panel 10. The molding strip 14 has an inturned flange 16 formed along the length of each edge thereof, the outer surface of the flange 16 bearing against the supporting panel 10. The molding strip 14 may be of any suitable cross-sectional configuration and of any suitable size.

A fastener assembly, illustrated generally by the numeral 18, is to be used to secure the molding strip 14 to the supporting panel 10. A plate member 20 forms the body of the clip and extends transversely of the molding strip 14 such that the outer edges 22 of the plate member 20 engage the inner surfaces of the inturned flanges 16 formed along the edges of the molding strip 14. The plate member may be a short length of material, or may extend the length of the molding strip. The plate member may be provided with a keyhole slot, illustrated generally by the numeral 24 in FIGURE 2, the keyhole slot comprising a circular hole 26 and an elongated slot 28, the hole and slot being interconnected to provide one continuous opening.

A stud element, illustrated generally by the numeral 30, is received in the keyhole slot 24 and in the aperture 12 in the supporting panel 10 to retain the plate member 20 and molding strip 14 in their proper positions. Stud element 30 is provided with an enlarged head 32, of substantially the same size as the circular opening 26 in the plate member 20. Immediately adjacent the head 32 is a portion 34 of decreased diameter, substantially the same size as the width of the elongated slot 28 formed in the plate member 20. It may be seen that when the stud 30 is to be installed in the plate member 20 the enlarged head 32 is passed through the circular hole 26 and the portion of decreased diameter 34 allows the stud to be slid into the elongated opening 28, at which point the enlarged head 32 prevents removal of the stud 30 from the plate member 20. Since the slot 28 is elongated, it is seen that a certain amount of lateral adjustment is permitted the stud 30 to take up misalignment and manufacturing tolerances in the location of the fastener device with respect to the aperture 12 in the supporting panel 10.

The stud element 30 has a central bore 36 formed partially therethrough and in an axial direction. Further, the stud element 30 is provided with a conical section 38 of increasing diameter which permits the stud element 30 to be forced into the aperture 12 in the supporting panel 10 and locked therein. As the stud element 30 is pushed through the aperture 12, the portion of increasing diameter 38 contracts, due to the presence of the central bore 36, to a sufficient degree to pass through the aperture 12. As the portion 38 clears the aperture 12 on the inside of the supporting panel 10, the resiliency of the stud element 30 causes the portion 38 to expand to its original position. This position is designed to be larger than the dimension of the aperture 12, securely locking the stud element 30 in the supporting panel 10.

In order to properly space the plate member 20 from the supporting panel 10 and to aid in sealing the aperture 12 against the entry of water collecting in the vicinity of the aperture 12, an annular ring 40 is received about the stud element 30 and between the plate member 20 and supporting panel 10. The axial dimensions of the stud element are such that the ring 40 tends to clamp the supporting panel 10 between itself and the portion 38. Further, the ring 40 tends to clamp the plate member 20 between itself and the enlarged head 32 of the stud element. The overall dimension is such that when the parts are properly installed, the ring 40 will closely engage the supporting panel 10 to aid in sealing the aperture 12.

Figure 4:
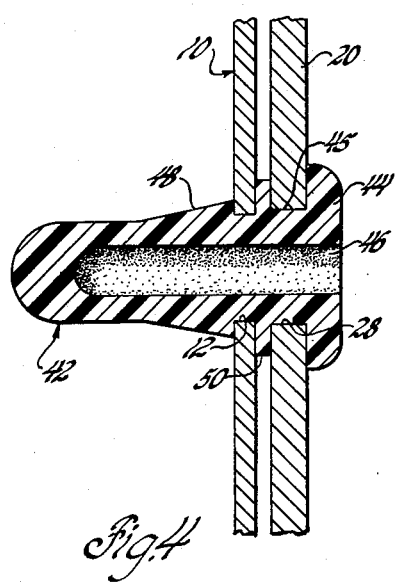
FIGURE 4 is a cross-sectional view of a modification of the stud element for a molding strip installation.
Figure 5:
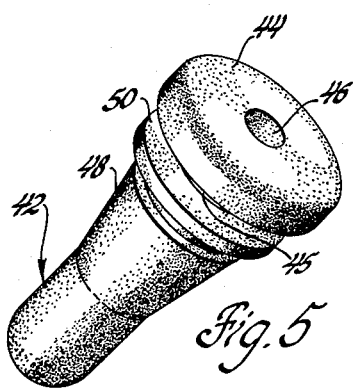
FIGURE 5 is a perspective view of the stud element illustrated in FIGURE 4.

A modification of the stud element is illustrated in FIGURES 4 and 5, in which the plate member 20 is to be secured to the supporting panel 10 having a suitable aperture 12. A stud element, illustrated generally by the numeral 42, has an enlarged head 44 and section of lesser diameter 45 which is mounted in the elongated portion 28 of the keyhole slot 24 in the manner above described with reference to FIGURE 2. A central bore 46 is provided in the stud element 42 and the portion of increasing diameter 48 permits the stud to be securely locked in the aperture 12 of the supporting panel 10. The same contraction and expansion of the portion 48 as it passes through the aperture 12 takes place as above described with reference to the modification illustrated in FIGURES 1 and 2.

Disposed between the supporting panel 10 and the plate member 20 is an integral flange 50 extending radially outwardly from the body of the stud 42. The flange serves to space the plate member 20 from the supporting panel 10 and aids in sealing the aperture 12. The stud element 42 is dimensioned so that the portion 48 and the flange 50 tend to clamp the supporting panel 10, and the flange 50 and enlarged head 44 tend to clamp the plate member 20 therebetween. This provides for a positive retention of the plate member and, consequently, the molding strip in the supporting panel 10.

Figure 6:
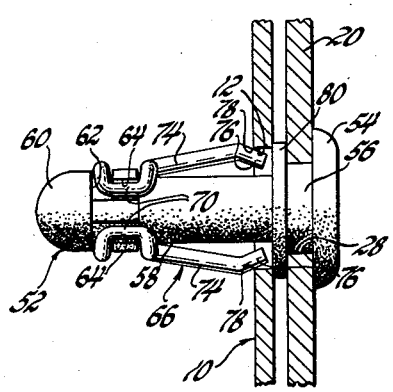
FIGURE 6 is a second modification of a stud element utilized in a molding strip installation.
Figure 7:
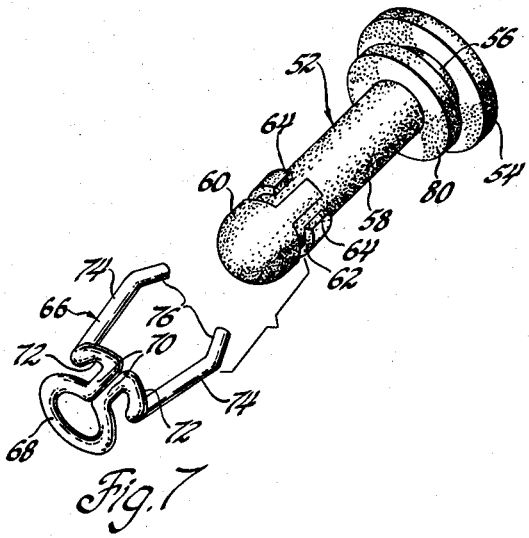
FIGURE 7 is an exploded perspective view of the stud element illustrated in FIGURE 6.

FIGURES 6 and 7 illustrate another modification of the molding strip installation, in which a plate member 20 is to be secured to a supporting panel 10 having a suitable aperture 12. A stud element, illustrated generally by the numeral 52, has an enlarged head portion 54 and a portion of decreased diameter 56 receivable in the elongated slot portion 28 of the keyhole slot 24, the enlarged head 54 preventing the stud element from passing through the plate member 20 while in this position.

The shank 58 of the stud element 52 has an enlarged end 60 opposite the head 54. An annular groove 62 is provided in the enlarged end 60 and a pair of axial grooves 64 are provided which interconnect with the annular groove 62. A resilient spring element, illustrated generally by the numeral 66, is received in the annular groove 62 and the axial grooves 64, in a manner illustrated in FIGURE 6, such that the lower turn 68 of the spring element 66 is received in the annular grove 62 and the longitudinal portions 70 of the spring element 66 are received in the axial grooves 64. Thus, the spring element 66 is positively located on the enlarged portion 60 of the stud element 52, and the natural resiliency of the spring 66 retains the spring on the stud element 52.

Extending from the upper turn 72 of the spring element 66 are a pair of spring arms 74 extending toward the supporting panel 10. The upper ends 76 of the spring arms 74 are bent inwardly such that inclined surfaces are provided that engage the inner corner 78 of the panel 10 about the aperture 12. It may be seen that as the stud element 52 and spring 66 are passed through the aperture 12, the spring arms 74 will compress against the shank 58 and as the spring arms 74 clear the corner 78 about the aperture 12, the ends 76 and spring arms 74 will expand such that the ends 76 engage the corner 78. Movement out of the panel 10 is thus prevented and the parts assume a position as illustrated in FIGURE 6.

Disposed between the plate member 20 and the supporting panel 10 is an annular flange 80, extending radially outwardly from the shank 58 of the stud element 52. Flange 80 spaces the plate member from the supporting panel and also serves with the spring arms 74 and the head 54 of the stud element 52 to clamp the various parts as previously described. Flange 80 also serves to seal the aperture 12 in the supporting panel 10.

Figure 8:
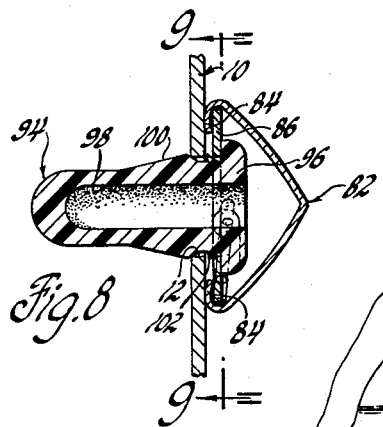
FIGURE 8 is a cross-sectional view of a molding strip installation illustrating a third modification of a stud element utilized with a different shaped molding strip.
Figure 9:
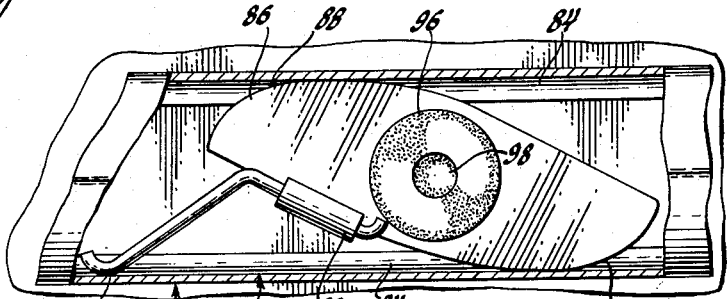
FIGURE 9 is a front view of the molding strip installation illustrated in FIGURE 8, taken substantially along the line 9—9 of FIGURE 8 and looking in the direction of the arrows.
Figure 10:
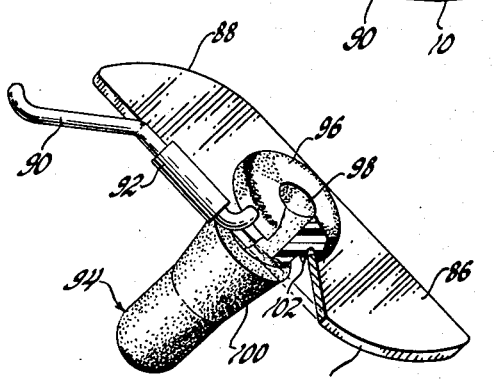
FIGURE 10 is a perspective view of the stud element and plate member of the molding strip installation illustrated in FIGURES 8 and 9.

A third modification of the stud element and the molding strip installation is illustrated in FIGURES 8 through 10. A molding strip, illustrated generally by the numeral 82, is to be retained on a supporting panel 10 having a suitable aperture 12 formed therein. Molding strip 82 is provided with inturned flanges 84, adapted to engage the outer surface of the supporting panel 10. A plate member 86 extends transversely between the flanges 84 and may take the form of a cam plate, as illustrated in FIGURES 9 and 10, having curved edges 88 at opposite corners and a spring arm 90 secured thereto to rotatably bias the plate 86 into engagement with the edges of the molding strip 82. Spring arm 90 may be secured to the plate 86 in any suitable manner, as by a tab 92 extending from the plate member 86 and rolled over one end of the spring 90.

A stud element, illustrated generally by the numeral 94, is provided with an enlarged head 96. The stud element 94 is received in a suitable aperture formed in the plate member 86, which aperture may take the form of a keyhole slot, as illustrated in FIGURE 2, or which may be of some other configuration through which the stud element 94 may be installed. Head 96 is of such dimension as to prevent the stud from passing completely through the plate member 86. The stud 94 is provided with a central bore 98 extending partially therethrough, and a portion 100 of increased diameter and larger than the dimension of the aperture 12. As above described, the portion 100 first contracts and then expands as the stud element 94 is passed through the aperture 12 in the supporting panel 10 to retain the plate member 86 and molding strip 82 against the supporting panel 10.

Immediately adjacent the head 96 of the stud element 94 is an annular flange 102 which is slightly larger than the size of the opening formed in the cam plate 86. Flange 102 along with the head 96 tends to clamp the plate member 86 therebetween.

The assembly of the molding installations above described is as follows:

The stud element is first placed in the opening in the plate member and slid into its locking position in the elongated slot. The stud and plate member are then slid or otherwise placed in the molding strip between the inturned flanges. In the case of the modification illustrated in FIGURES 8 through 10, the spring element 90 rotatably biases the plate member 86 into engagement with the inner corners of the molding strip to hold the fastener assembly in position. In the remaining modifications, the dimensions of the plate member may be such as to hold the fastener assembly in the molding strip prior to installation in the supporting panel 10. In this manner the molding strip and the fastener assembly may be transported from place-to-place without the fastener assembly disengaging. When the molding strip and fastener assembly are to be installed in the supporting panel, they are merely placed in position over the aperture in the supporting panel and pushed inwardly. The portion of increased diameter below the head of the stud element contracts and then expands as it passes through the aperture in the supporting panel to securely lock the stud element, the plate member and the molding strip in the proper with respect to the supporting panel.

Thus, a molding strip installation is provided which is adaptable to a wide variety of shapes and sizes and is relatively simple to manufacture and assemble. The retention of the molding strip on the supporting panel is positive and the aperture in the supporting panel is suitably sealed against the entry of water collecting thereabout and preventing rust and corrosion from forming.

What is claimed is:

1. A molding strip installation comprising a supporting panel having an aperture formed therethrough, a molding strip secured to said supporting panel and having inturned flanges along opposite edges thereof, a plate received in said molding strip and extending transversely thereof to engage said inturned flanges, said plate having an opening formed therein, and a stud member received in said opening in said plate and extending through said aperture in said panel, said stud having a head formed thereon and disposed on the opposite side of said plate from said panel, a spring member receivable about the end of said stud opposite from said head and having a pair of spring arms extending toward said panel, said spring arms having a bend near the end thereof to provide an inclined surface engaging the inner corner of said aperture in said panel to retain said stud therein, and sealing and clamping means associated with said stud and disposed between said panel and said plate to space said plate from said panel and to seal said aperture in said panel and to provide clamping means with said head for said plate and clamping means with said resilient means for said panel for securing said molding strip and said plate on said panel.

2. A fastener assembly for securing a molding strip having inturned flanges along the edges thereof to a supporting panel having an aperture formed therethrough, said assembly comprising a plate receivable in said molding strip and adapted to engage said inturned flanges, said plate having an opening formed therethrough a stud having an enlarged head at one end received in said plate and extending therefrom, a spring member receivable about the end of said stud opposite from said head and having a pair of spring arms extending toward said panel, said spring arms having a bend near the end thereof to provide an inclined surface engaging the inner corner of said aperture in said panel to retain said stud therein, and clamping and sealing means on said stud and between said head and said resilient means and spaced from said head a distance equal to the thickness of said plate and clamping said plate therebetween for retention in said panel.

References Cited in the file of this patent

UNITED STATES PATENTS

| | | |
|---|---|---|
| 2,788,100 | Landell | Apr. 9, 1957 |
| 2,900,687 | Cochran | Aug. 25, 1959 |
| 2,951,674 | Rice | Sept. 6, 1960 |